United States Patent [19]

Kleisle et al.

[11] Patent Number: 4,740,981

[45] Date of Patent: Apr. 26, 1988

[54] TEMPERATURE CONTROLLER FOR GAS LASER RESONATOR

[75] Inventors: James R. Kleisle; Gregory J. Koob, both of St. Louis, Mo.

[73] Assignee: Stemmerich, Inc., St. Louis, Mo.

[21] Appl. No.: 917,718

[22] Filed: Oct. 10, 1986

[51] Int. Cl.$^4$ ............................................... H01S 3/22
[52] U.S. Cl. ........................................ 372/59; 372/34; 372/35; 165/139; 165/154
[58] Field of Search ...................... 372/34, 109, 61, 59, 372/35, 55, 65, 58; 165/139, 154

[56] References Cited

U.S. PATENT DOCUMENTS

| | | | |
|---|---|---|---|
| 3,599,113 | 8/1971 | Cremosnik | 372/35 |
| 4,547,885 | 10/1985 | Allen et al. | 372/58 |
| 4,660,209 | 4/1987 | Osada et al. | 372/58 |
| 4,661,958 | 4/1987 | Bowes et al. | 372/54 |

Primary Examiner—James W. Davie
Assistant Examiner—B. Randolph
Attorney, Agent, or Firm—Richard G. Heywood

[57] ABSTRACT

A temperature controller unit for use in a gas laser resonator structure using a gas lasing medium excited within a resonator cavity having reflective optical surfaces for producing a beam of coherent radiation, and the gas lasing medium being circulated through a heat exchanger to maintain a predetermined lasing temperature range. The temperature controller unit includes a tubular member of substantial length forming a primary chamber for conducting said gas lasing medium through the heat exchanger in a non-contaminating environment to reduce gas contaminate buildup on the optical surfaces in the resonator cavity, end caps sealably closing the ends of the tubular member and receiving gas lasing medium from the resonator structure, and an outlet tube having an open end positioned within the primary chamber for conveying the gas lasing medium for recirculation to the resonator structure. The method of assembling the temperature controller unit including the steps of inserting the outlet tube into the tubular member, providing a protective device for the tubular member during installation within the outer casing of the heat exchanger, removing the protective device and orienting the tubular member longitudinally, extending and inserting the outer end of the outlet tube through one end cap, and applying the end caps to the tubular member.

18 Claims, 4 Drawing Sheets

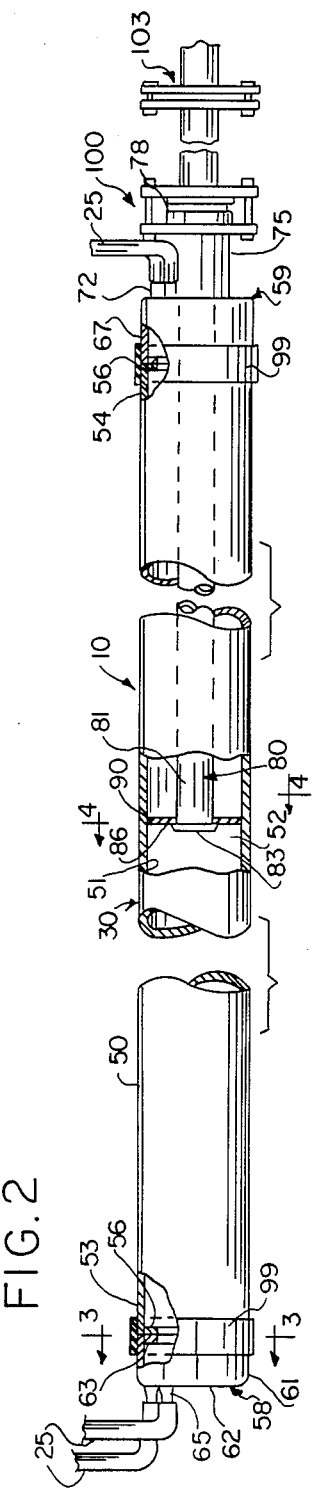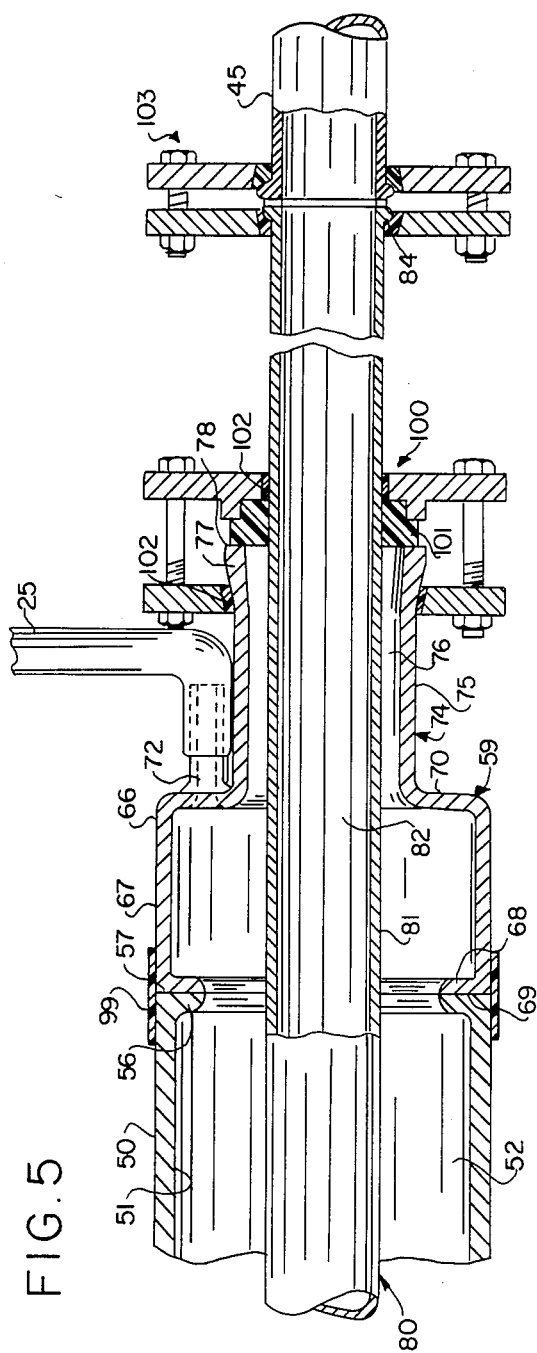

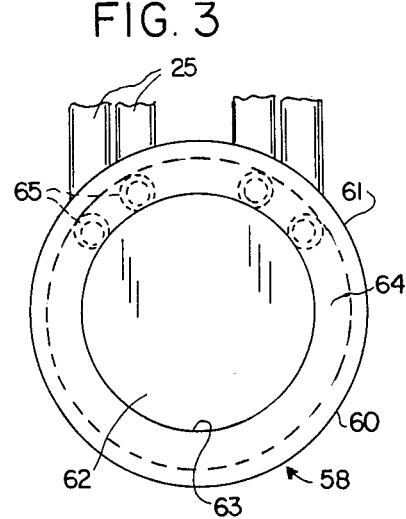
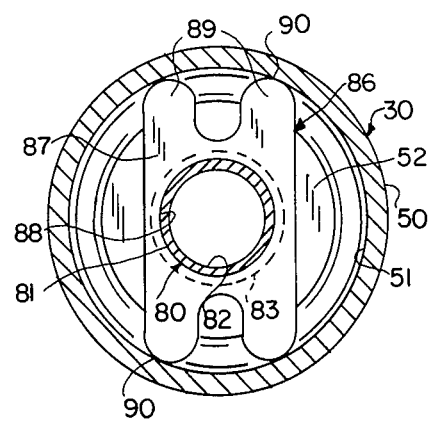
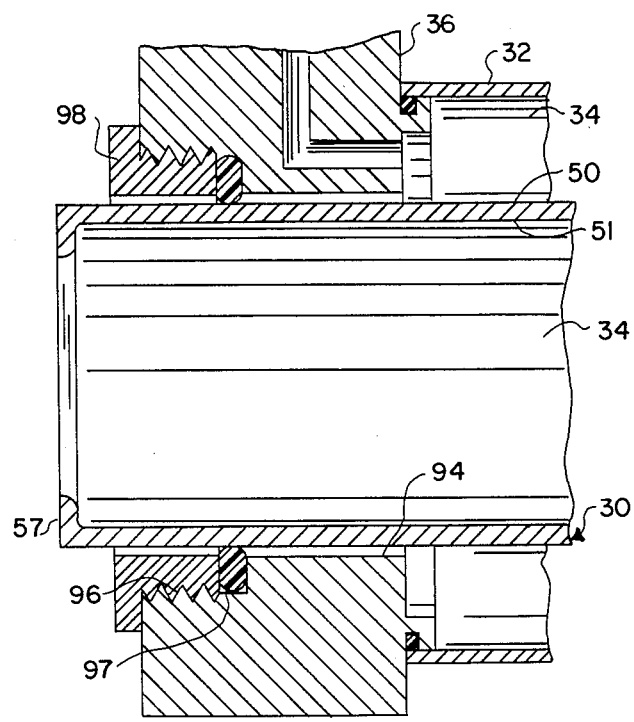

TEMPERATURE CONTROLLER FOR GAS LASER RESONATOR

This invention relates to an improved temperature controller unit for a gas laser resonator apparatus. The invention also relates to a method for assembling the temperature controller.

BACKGROUND OF THE INVENTION

Existing laser systems have an optical resonator structure in which an active gas lasing medium, such as a gaseous mixture of $CO_2$, $N_2$ and He is excited to produce a beam of coherent radiation. Precise optical components including mirrored surfaces at either end of the resonator cavity are exposed to the gas lasing medium. It is critical to the laser resonator and optical components thereof that the lasing medium be maintained at a predetermined temperature, in the range of 20°-30° C.

Prior laser resonators have controlled the temperature of the lasing medium by using heat exchangers having concentrically arranged tube-in-tube constructions with the gas lasing medium flowing through the inner tube or primary chamber and the stabilizing heat-exchange fluid, such as oil or water, flowing through an outer secondary chamber between the inner tube and a metal outer casing.

Contamination of the gas lasing medium is a major problem and adversely affects the useful life of optical resonator components. Such contamination occurs in the circulation of the lasing gas from the resonator structure through fittings, hose connections, heat exchangers and pumps, and a principal source of such contamination has been in the primary or first heat exchanger in which the high temperatures implied upon the gas in the resonator are reduced back into the range of ambient temperatures. The inner gas conveying tube in an existing primary heat exchanger for a laser resonator is believed to have been constructed of PVC (polyvinyl chloride) tubing from which oxides or like contaminates are induced into the gas lasing medium. Since the lasing medium is recirculated from the heat exchanger to the resonator cavity for reuse, such contaminates have been deposited on mirrored optical surfaces and substantially reduced the efficiency of the laser, thereby necessitating the frequent replacement of optical components. This causes downtime for replacement of the optical components with an incident loss of production time and great expense.

The contamination problem has not been solved heretofore. Filtering the gas lasing medium using a micron filtering arrangement does not effectively remove such contaminates, and acceptable substitutes for the primary PVC temperature controller (not contributing to the contamination problem) have not been available.

Replacement of the primary temperature controller (inner tube) is also complex due to unique assembly problems. The laser may be installed near structural walls or other obstructions, which limits access essentially to one end of the exchanger since the inner and outer tubes in this heat exchanger are typically in the magnitude of 12 feet in length. The assembly operation is relatively simple if a PVC inner tube is used since connections, joints, etc. may be easily glued. However, if non-contaminating materials are used, the assembly and installation becomes critical. For example, if glass is used for the inner tube (primary chamber) as in the present invention, the approximately 12 foot long glass inner tube must be slid down the entire length of the approximately 12 foot long outer metal casing and channeled through openings in the heat exchanger manifold at both ends. Moreover, compatible end caps, connectors, fittings, etc. must be used to complete the flow of the gas lasing medium. Such a temperature controller meeting these criteria has heretofore not been available.

SUMMARY OF THE INVENTION

Briefly, the invention is embodied in a gas laser resonator structure using a gas lasing medium excited within a resonator cavity having reflective optical surfaces for producing a beam of coherent radiation, and the gas lasing medium being circulated through a heat exchanger to maintain a predetermined lasing temperature range; and which comprises a temperature controller unit including a tubular member of substantial length forming a primary chamber for conducting said gas lasing medium through the heat exchanger in a non-contaminating environment to substantially eliminate gas contamination of the gas lasing medium through the heat exchanger and thereby reduce contaminate buildup on the optical surfaces in the resonator cavity, end caps sealably closing the ends of said tubular member and receiving gas lasing medium from the resonator structure, and an outlet tube having an open inlet end positioned within the primary chamber for conveying the gas lasing medium for recirculation to the resonator structure. The invention is also embodied in the assembly method of the temperature controller unit including the steps of inserting the outlet tube into the tubular member, providing protective means for the tubular member during installation within the outer casing of the heat exchanger, removing the protective means and orienting the tubular member longitudinally, extending and inserting the outer end of the outlet tube through one end cap, and applying the end caps to the tubular member.

Among the several objects is the provision of a temperature controller for a gas laser resonator that contributes minimal amounts of contaminate to the lasing medium; the provision of such a temperature controller that will reduce the frequency of replacement or maintenance of the optical components in the laser resonator; the provision of such a temperature controller that will reduce the downtime of the laser resonator structure; the provision of such a temperature controller which will replace existing PVC temperature controllers; the provision of such a temperature controller which may be assembled from one end of the heat exchanger; and the provision of such a temperature controller which is commercially feasible and economically practical.

These and other objects and features will become apparent hereinafter.

BRIEF DESCRIPTION OF THE DRAWINGS

In the accompanying drawings, wherein like reference numerals refer to like parts wherever they occur:

FIG. 2 is an enlarged view of the temperature controller of FIG. 1 partly broken away to show cross-sectional areas thereof;

FIG. 3 is a greatly enlarged cross-sectional view taken along line 3—3 of FIG. 2;

FIG. 4 is a greatly enlarged cross-sectional view taken along line 4—4 of FIG. 2;

FIG. 5 is a greatly enlarged sectional view of end cap and the outlet tube assembly for the temperature controller of FIG. 2;

FIG. 7 is a partial sectional view showing the installation assembly of the temperature controller in the heat exchanger at the opposite end from that shown in FIG. 5.

DETAILED DESCRIPTION OF A PREFERRED EMBODIMENT

Figure 1:
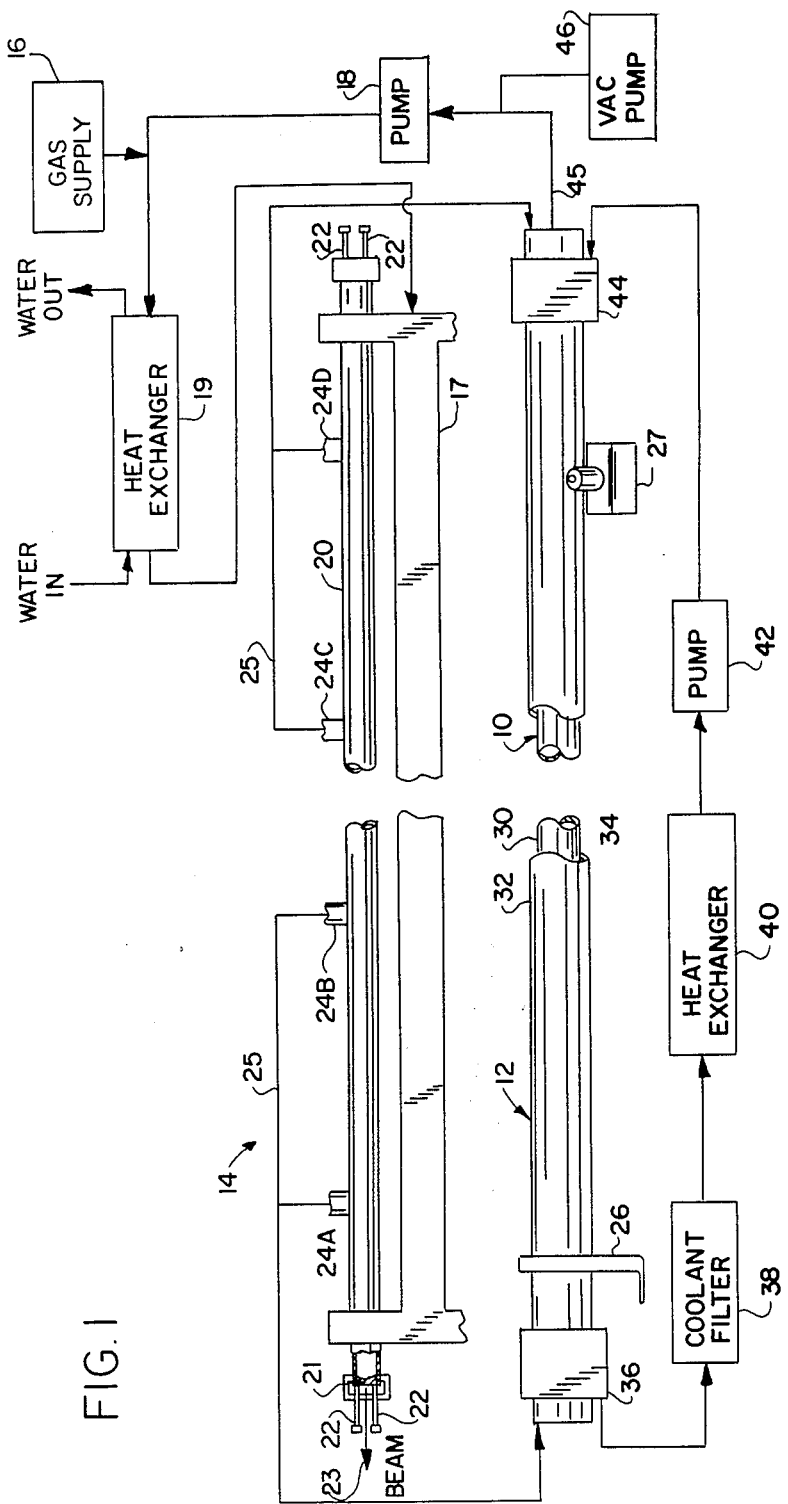
FIG. 1 is a diagrammatic view of a laser resonator apparatus showing the temperature controller unit of the present invention in the heat exchanger therefor.

Referring to FIG. 1, a temperature controller unit 10 embodying the present invention is illustrated in a primary or first heat exchanger 12 for a gas laser resonator apparatus 14 that is diagrammatically shown for an understanding of the invention. For environmental purposes, Allen et al. U.S. Pat. No. 4,502,145 is also incorporated by reference in its entirety. Such laser resonator apparatus 14 uses a gas lasing medium typically comprising a mixture of $CO_2$, $N_2$ and He, although other gas mixtures are considered as within the scope of the present inventive field. Furthermore, the gas laser resonator 14 has a new or fresh gas supply 16 that is combined with recycled gas circulated from an optical resonator structure 17 through the heat exchanger 12 and pump 18.

In the general construction and operation of the laser resonator apparatus 14, the mixture of new and recycled gas is passed through a final heat exchanger 19 utilizing water as a coolant to maintain a predetermined lasing gas temperature for supply to the optical resonator structure 17. In the resonator structure 17, the gas passes into a discharge tube or resonator cavity 20 having optical components 21 including concave mirrored surfaces at each end with adjustments 22 for precise alignment. The lasing action of gas is produced in the resonator cavity 20 generating a beam 23 of coherent radiation from the optical components 21. It will be understood that the mirrored surfaces of the optical components 21 are thus exposed to the gas lasing medium and will be adversely affected by contaminates contained in the gas lasing medium, which causes deposits on the surfaces and requires periodic replacement.

The gas lasing medium exits the resonator cavity 20 through ports 24A-24D. This excited gas has been heated within the cavity 20 and is passed through conduits 25 to both ends of the primary heat exchanger 12. The heat exchanger 12 is supported by a standoff 26 and kinematic mounts 27. Included in the heat exchanger 12 is the temperature controller unit 10 of the present invention, which includes a main tubular member or inner tube 30 forming a primary gas cooling chamber, and being concentrically mounted within an outer tube or casing member 32 of the heat exchanger 12. The outer casing member 32 may be made of ⅜" steel tubing.

The heated gas from resonator cavity 20 passes into and through the primary chamber of the inner tube 30. A coolant or stabilizing heat exchange fluid, such as oil, for the heat exchanger 12 is circulated in the space or coolant chamber 34 between the outer tube 32 and the inner tube 30. The circulating oil exits through a first header or manifold 36 at one end of the heat exchanger 12, passes through a coolant filter 38, is cooled in another heat exchanger 40, and is recycled by pump 42 through the other or second header or manifold 44 at another end of heat exchanger 12.

The gas lasing medium is thus cooled in heat exchanger 12 and exists in a cooled condition through discharge conduit or line 45. The temperature of the gas is approximately in the range of ambient temperature 20°-30° C. Temperature and pressure regulation of the gas may be accomplished by temperature control servos and associated apparatus as described in U.S. Pat. No. 4,502,145. The pump 18 is utilized to circulate the gas lasing medium back to the heat exchanger 19. A vacuum pump 46 continually draws off a small amount of the gas to maintain a negative pressure in the temperature controller unit 10.

Referring now to FIGS. 2-5, the temperature controller unit 10 of the present invention provides a non-contaminating structure in which the substantial temperatures generated during excitation of the gas lasing medium in the resonator cavity 20 are cooled by heat exchange with the coolant circulated through the circumscribing coolant chamber 34 within the outer casing member 32 of the heat exchanger 12. The temperature controller unit 10 comprises the main tubular member 30, which is of substantial length and in the magnitude of twelve (12) feet in a typical resonator apparatus 14. The tubular member 30 is cylindrical in the preferred embodiment, and has an outer wall 50, an inner wall 51 defining a central primary chamber 52, and opposed ends 53 and 54. The ends 53 and 54 are provided with inturned beads 56 having end abutment surfaces 57 (FIG. 5), that are gound or lapped to a smooth finish for sealing contact as will appear.

End caps 58 and 59 are provided for sealing engagement with the end abutment surfaces 57 of the main tubular member 30. The end cap 58 (left end in FIG. 2) has a cup-shaped body 60 with an annular side wall 61 of substantially the same circumference as the outer wall 50 of the tubular member 30, and an integral closed end wall 62 is provided at the outer end of the annular wall 61. The inner end of the annular wall 61 is formed with an inturned bead or flange 63 that is also lap ground to form a radial annular abutment surface 64 to mate precisely with the opposing abutment surface 57 of the bead 56 at end 53 of the tubular member 30 and provide a sealing fit therebetween. The end cap 58 is formed with tubulations 65 ported through the end wall 62 adjacent to the annular side wall 61 and connected by the conduits 25 to receive gas lasing medium from the resonator cavity 20 for cooling circulation within the heat exchanger 12.

The end cap 59 (right end in FIG. 2, and shown best in FIGS. 5 and 6) has a cup-shaped body 66 similar to the body 60 of end cap 58, with an annular outer side wall 67 having an inturned bead or flange 68 having a lapped abutment surface 69 for mating sealing engagement with the end abutment surface 57 at the end 54 of the main tubular member 30. The end wall 70 of the end cap 59 is provided tubulations 72 ported therethrough adjacent to the annular wall 67 and connected to conduits 25 to receive gas lasing medium from the resonator cavity 20 for cooling circulation within the heat exchanger 12. The end wall 70 is also formed with an integral tubular extension 74, which in the preferred embodiment is cylindrical and axially located. The tubular extension 74 has a cylindrical wall 75 defining a central elongated passageway 76 therethrough, and the outer free end 77 is flared and formed with an end abutment surface 78.

The temperature controller unit 10 also comprises a gas outlet tube 80 for conducting cooled gas lasing medium from the primary chamber 52 to discharge conduit 45 for recycling under the impetus of pumping means 46, 18. The gas outlet tube 80 is of substantial length, in the magnitude of six (6) to eight (8) feet as will appear. The outlet tube 80 has a cylindrical wall 81 defining a central passageway 82. The inner or inlet (lefthand) end of the outlet tube 80 has an outwardly formed flange or inner bead 83, and the outer or outlet (righthand) end also has an outwardly formed flange or outer bead 84 and it should be noted that this bead 84 is sized to pass through the central passageway 76 of the end cap extension 74 during assembly operations as will be described. The gas outlet tube 80 is provided with a spacer member 86 having a central body portion 87 with a central opening 88 to receive the cylindrical wall 81 therethrough. The spacer member 86 has a plurality of spaced fingers or ears 89 radiating outwardly and having arcuate end surfaces 90 for sliding engagement with the inner wall 51 of the central chamber 52 of the tubular member 30. The spacer member 86 is relatively rigid and wedges against the inner bead 83 of the outlet tube 80 to support it in coaxial position within the primary chamber 52, and it will be clear that the spaced fingers 89 are designed to provide optimium gas flow therepast from the righthand inlet tubulations 72.

A primary feature of the invention is to provide a non-contaminating environment for heat exchange of the gas lasing medium and, to that end, the main tubular member 30, end caps 58 and 59 and outlet tube 80 are all formed of an inert material, such as boro-silicate glass. It has been learned in field opertions that this improvement results in increased laser resonator efficiency by extending the operative life of optical components as much as thirty-five (35%) percent and results in savings of several thousand dollars. It will also be understood that glass-to-glass contact should normally be avoided wherever possible and the spacer member 86 is therefore formed of TFE Teflon or like material having low contamination properties. However, it has been discovered that excellent sealing engagement can be formed between the end caps 58 and 59 with the respective end abutment surfaces 57 of the main tubular member 30 without the need for neoprene or like resilient gaskets other than to seal the end 78 of the tubular extension 74 to the outlet tube 80 which is outside the flow path of gas lasing medium through the temperature controller unit 10.

From the foregoing it will be apparent that the heated gas lasing medium is circulated from the optical resonator cavity 20 through conduits 25, also preferably of glass, to the end cap tubulations 65 and 72 at both ends of the temperature controller unit 10. The pump 46 draws a negative pressure or "vacuum" in the temperature controller unit 10. This negative pressure maintains the end caps 58 and 59 in sealable engagement with the end abutment surfaces 57 of the main tubular member 30 during operation, and it will be noted that the location of the tubulations adjacent to the annular end cap walls 61 and 67 are longitudinally opposite to the inturned beads 63 and 68 of the end caps 58 and 59 so that gas flow impinges against these beads and creates a turbulence that is believed to increase the heat exchange efficiency within the chamber 52. The gas flow is axially inward from both ends of the main tubular member 30 to the inner end of the gas outlet tube 80 and thence outwardly through the central passageway 82 to the discharge conduit 45, also preferably of glass.

Figure 6:
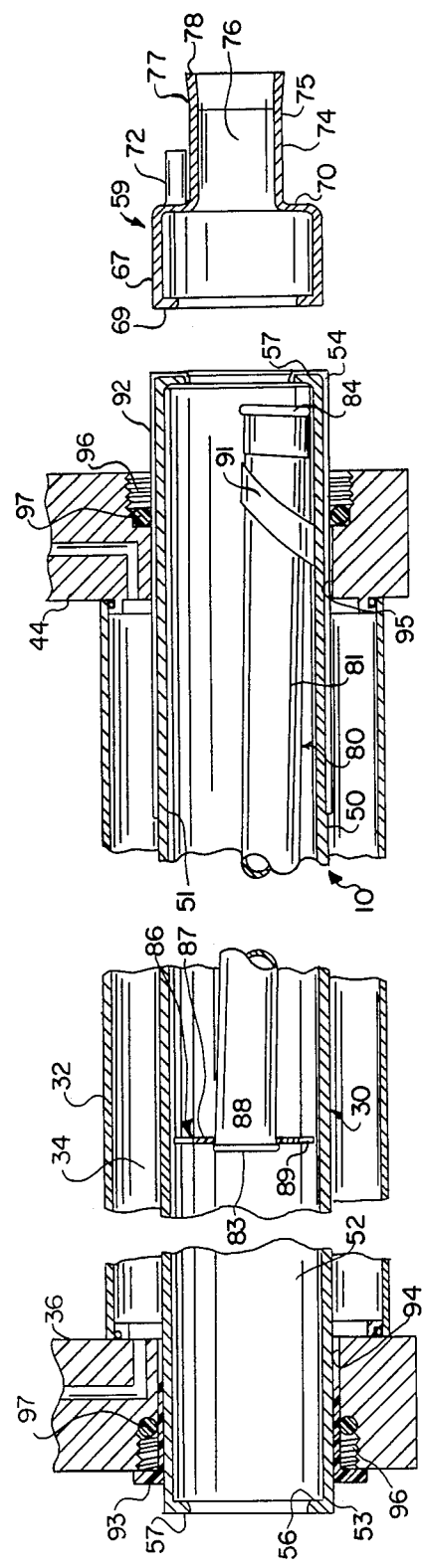
FIG. 6 is a fragmentary sectional view showing one stage of installation assembly of the temperature controller in the heat exchanger.

Referring now to FIGS. 6 and 7, a method of assemblying and installing the temperature controller unit 10 in the heat exchanger 12 is illustrated. Due to the probable, if not frequent location of the laser resonator apparatus 14 near a structural wall or other equipment or obstruction and due to the substantial lengths of the main tubular member 30 (e.g., 12 feet) and gas outlet tube 80 (e.g., 6-8 feet) and the fragile nature of these components, protective care is required in the assembly.

One of the initial steps is to slide the gas outlet tube 80 through the central opening 88 of the spacer member 86 before the beads 83 and 84 are outwardly formed at both ends for finishing the outlet tube 80. Then, after these beads are formed, the spacer member 86 is moved into wedging engagement with the inner bead 83. Assuming that the outlet end of the temperature controller unit 10 is near an obstruction, the entire length of the gas outlet tube 80 is moved into the primary chamber 52 of the tubular member 30 with the spacer member 86 centering the inner end 83 in the chamber 52 and the outer end thereof being taped down temporarily, as at 91 in FIG. 6. The outlet end 54 of the tubular member 30 is provided with a protective covering 92, such as a shrink-wrap plastic casing, and a removable teflon bushing 93 or like protective lining is applied in opening 94 of the manifold 36.

The end 54 of the tubular member 30 is then positioned in the bushing 93 and the member 30 is slid longitudinally through the manifold 36 and outer casing member 32 to the remote manifold 44. The end 54 is then aligned with opening 95 in manifold 44 and the member 30 is pushed on through the opening 95 to extend far enough to remove the shrink-wrap covering 92, and the member 30 is then oriented axially in assembled position. The bushing 93 is removed from opening 94 in manifold 36. Both manifold openings 94 and 95 are counterbored and threaded, at 96, and provided with O-rings 97, and a threaded collar 98, FIG. 7, is applied to compress the O-rings into sealing engagement with the outer wall 50 and to provide a resilient cushion for the tubular member 30 in these manifolds 36 and 44.

The end cap 58 is assembled on the end 53 of the main tubular member 30 and held in place by a resilient gasket 99, FIG. 2. The outlet tube 80 is untaped from the primary chamber inner wall 51 and extended outwardly through the end 54 of the tubular member 30, and the end cap 59 is applied over the outlet tube 80 to the end 54 and also retained in place by another resilient gasket 99. A sealing clamp 100 having resilient seal 101 is applied to the flared end 77 of the tubular extension 74 to compress and form a seal between the end surface 78 and the outer wall 81 of the outlet tube 80, and it will again be noted that the clamp 100 includes liners 102 to prevent metal-to-glass contact of the clamp with the tubular extension 74 outlet tube 80. The outer end (bead 84) of the outlet tube 80 is then connected by another clamp 103 to the discharge conduit 45 and the conduits 25 are connected to the end tubulations 65 and 72 to complete the assembly of the temperature controller unit 10 in the heat exchanger 12 and into the resonator apparatus 14.

It will be apparent to those skilled in the art that changes and modifications can be made in embodiment disclosed, and the invention is only limited by the scope of the claims appended hereto.

What is claimed is:

1. In a gas laser resonator apparatus utilizing a gas lasing medium that is excited within a resonator cavity having reflective optical surfaces for producing a beam of coherent radiation, a heat exchanger located externally of the resonator cavity, and means for circulating the gas lasing medium from the resonator cavity through the heat exchanger to regulate the temperature of the gas lasing medium, the improvement comprising a temperature controller unit for conducting the gas laser medium within and through the heat exchanger including a tubular member of inert material and having a substantial length forming a primary chamber for conducting said gas lasing medium for heat exchange in a non-contaminating environment to thereby subsequently reduce gas contaminate buildup on the optical surfaces in the resonator cavity, end caps sealably closing the ends of said tubular member and including means for receiving gas lasing medium from the resonator cavity for circulation within said primary chamber, a gas outlet tube extending through one of said end caps and having an open inner end positioned within said primary chamber for receiving and conveying cooled gas lasing medium from said heat exchanger for recirculation to the resonator cavity, and spacer means for supporting the inner end of said outlet tube within said primary chamber.

2. The laser resonator apparatus according to claim 1, in which said end caps and outlet tube are also formed of inert non-contaminating material.

3. The laser resonator apparatus according to claim 1, in which said tubular member, end caps and outlet tube are formed of glass.

4. The laser resonator apparatus according to claim 1, in which at least one end of said tubular member and the end cap therefor are formed with inturned beads having lapped abutment surfaces to provide gas-tight sealing engagement therebetween.

5. The laser resonator apparatus according to claim 4, including pumping means for drawing the gas lasing medium through the primary chamber for recirculation to the resonator cavity, and the sealing engagement between the lapped surfaces of said one end of the tubular member and its mating end cap being maintained during operation by the negative pressure of said pumping means.

6. The laser resonator apparatus according to claim 1, in which a tubular extension member is provided on said one of said end caps extending away from the primary chamber and having a free outer end, said extension member having a central passageway to receive an outer portion of the gas outlet tube therethrough, and sealing means forming a seal between said extension member and the gas outlet tube therein.

7. The laser resonator apparatus according to claim 6, in which said free outer end of said extension member has an enlarged bevel forming an end abutment surface, and said sealing means including a circumscribing resilient sealing element engageable against said end abutment surface, and means compressively expanding said sealing element against the gas outlet tube.

8. The laser resonator apparatus according to claim 6, in which said gas outlet tube extends outwardly beyond said extension member and has an outer end constructed and arranged for connection to the circulating means for the gas lasing medium, said outer end being sized to pass through the passageway of said extension member during assembly of the temperature controller unit.

9. The laser resonator apparatus according to claim 6, in which said extension member is centrally disposed on said one end cap to extend axially therefrom and the outer portion of said gas outlet tube is supported and axially aligned in the central passageway of said extension member, and the inner end of said gas outlet tube being supported and axially aligned within said primary chamber by said spacer means.

10. The laser resonator apparatus according to claim 1, in which the inner end of said gas outlet tube is formed with an outwardly formed bead, and said spacer means comprises a central body portion with an opening receiving said outlet tube and a plurality of spaced ears extending outwardly from said body portion and having arcuate bearing surfaces in sliding contact within said primary chamber.

11. The laser resonator apparatus according to claim 10, in which said spacer means is integrally formed of different material than said tubular member, and said spacer means being wedged against said outwardly formed bead on said gas outlet tube during assembly.

12. The laser resonator apparatus according to claim 1, in which said end caps have tubulations forming inlet ports to receive gas lasing medium from said resonator cavity into said primary chamber at both ends, the open inner end of said gas outlet tube being positioned substantially equidistant from both end caps, and said spacer means being constructed and arranged to support and center said open inner end axially within said primary chamber without substantially restricting flow of gas lasing medium therepast.

13. The laser resonator apparatus according to claim 12, in which said end caps are cup-shaped and include annular side walls and end walls, the ends of said tubular member and the ends of the end cap annular walls opposite thereto being formed with inturned annular beads having opposing lapped abutment surfaces to provide gas-tight sealing engagement therebetween.

14. The laser resonator apparatus according to claim 13, in which said tubulations are formed on the end walls of said end caps adjacent to the annular side walls in opposed relation to said inturned beads whereby inlet flow of gas lasing medium through said tubulations impinges against said inturned beads and creates turbulence in such gas flow.

15. A temperature controller unit for use in a heat exchanger for a gas laser resonator using a gas lasing medium that is excited within a resonator cavity having reflective optical surfaces for producing a beam of coherent radiation and in which heat exchanger coolant is circulated to regulate the temperature of the gas lasing medium recycled therethrough from said resonator, said temperature controller unit including a main tubular member of substantial length to be assembled within the heat exchanger and forming a primary chamber for the conduction of gas lasing medium therethrough in a non-contaminating environment and in heat exchange relationship with the coolant, first and second end caps to sealably close the opposing ends of said tubular member and including inlet means for receiving gas lasing medium into said primary chamber of said temperature controller unit, the opposing ends of said tubular member and said end caps having inturned annular beads with lapped mating abutment surfaces to provide gas-tight sealing engagement therebetween, a gas outlet tube having an inner end disposed within said primary chamber and extending therefrom outwardly through one of said end caps, and means for supporting said gas outlet tube within said primary chamber, said tubular member, end caps and gas outlet tube being formed of inert material.

16. The temperature controller unit according to claim 15, in which said inert material is boro-silicate glass.

17. The temperature controller unit according to claim 16, in which said gas outlet tube is of substantial length and has its inner end longitudinally positioned substantially equidistant from both end caps, said means for supporting said outlet tube within said primary chamber comprising a spacer member formed of a relative thin and rigid material different from said boro-silicate glass material and being diametrally disposed on the inner end of said outlet tube, and other means for supporting the outward portion of said gas outlet tube.

18. A temperature controller unit for use in a heat exchanger for a gas laser resonator using a gas lasing medium that is excited within a resonator cavity having reflective optical surfaces for producing a beam of coherent radiation and in which heat exchanger coolant is circulated to regulate the temperature of the gas lasing medium recycled therethrough from said resonator, said temperature controller unit comprising a main tubular member of inert material forming an internal primary chamber of substantial length for heat exchange with coolant in said heat exchanger, first and second end caps of inert material for sealably closing said primary chamber, the opposing ends of said tubular member and said end caps having inturned annular beads with lapped mating abutment surfaces for forming gastight sealing engagement therebetween, another gas tube of inert material being substantially concentrically supported within said primary chamber, said other gas tube having an inner end disposed within the primary chamber between said end caps and said tube extending therefrom outwardly through one of said end caps, and means for connecting said temperature controller unit to the gas laser resonator for the conduction of gas lasing medium therefrom through said primary chamber between said end caps and said inner end of said other gas tube in a non-contaminating environment and in heat exchange relation with coolant in said heat exchanger.

* * * * *